March 14, 1961 C. D. JACKSON ET AL 2,975,239

ELECTROMAGNETIC ERASER

Filed Dec. 24, 1954 3 Sheets-Sheet 1

INVENTORS
CHAUNCEY D. JACKSON
WILLIAM L. BATCHELOR
DONALD B. THOMPSON
BY Ralph C. Dustin
ATTORNEY March 14, 1961 C. D. JACKSON ET AL 2,975,239

ELECTROMAGNETIC ERASER

Filed Dec. 24, 1954 3 Sheets-Sheet 2

INVENTORS
CHAUNCEY D. JACKSON
WILLIAM L. BATCHELOR
DONALD B. THOMPSON

BY Ralph C. Dustin

ATTORNEY

INVENTORS
CHAUNCEY D. JACKSON
WILLIAM L. BATCHELOR
DONALD B. THOMPSON
BY Ralph C. [signature]
ATTORNEY United States Patent Office 2,975,239

Patented Mar. 14, 1961

2,975,239

ELECTROMAGNETIC ERASER

Chauncey D. Jackson, Poughkeepsie, William L. Batchelor, Fishkill, and Donald B. Thompson, Poughkeepsie, N.Y., assignors to International Business Machines Corporation, New York, N.Y., a corporation of New York Filed Dec. 24, 1954, Ser. No. 477,553

17 Claims. (Cl. 179—100.2)

The present invention relates to an automatic erasing device for a magnetic recorder and more particularly to an erasing device adapted to erase in a relatively brief interval of time magnetic recorders of the type having a continuous loop or drum record member.

Magnetic drums or other forms of continuous loop magnetic recording devices are frequently utilized as storage devices for computers, generally high speed digital computers, and are employed as a storage medium for the information being processed by the computer. This type of storage medium has the advantages that it is relatively inexpensive to construct, and will store a vast amount of data with relatively low power consumption as compared to other data storage media having the same storage capacity.

During the magnetic recording process, data in the form of electrical pulses is converted to flux signals which are then applied to the magnetizable area of the record member. The portions of the drum surface which pass beneath the reading and writing heads are called information tracks, and the record member includes a plurality of such tracks which may be recorded individually in successive operations or simultaneously in a single operation. The transducer which converts the electrical pulses to magnetic flux is known as the write head, while the transducer which converts the flux back to electrical signals is known as a read head.

During the recording process, magnetization of the record member is greatly localized, thereby minimizing the required spacing between tracks. In addition, continuous writing in a track tends to build up a bias or noise signal in the bordering areas on each side of the track. In the case of adjacent tracks, this border area includes the area between these tracks. In a recording operation, while the magnetic state of the drum surface under the immediate area of the write head is reversed whenever signals opposite to the existing information are superimposed thereon, the adjoining areas may not be so influenced because of the limited sensitivity of the write head in these areas. Therefore, after continuous operation over a period of time, a signal level tends to build up in the area between adjacent tracks. The pattern of such a signal level cannot be predicted, since it depends upon the previous magnetic state of the recording medium as well as the direction of the flux being applied through the write head to the recording medium. Another factor influencing the magnetic state of the area between tracks is the tendency for magnetized portions in recording tracks to interfere with the alignment of magnetic particles in the adjoining area. The net effect of normal operation as described above is to introduce a bias or noise in the area between tracks.

In addition to the noise produced in normal operation as described above, noise may be produced by circuit failure of the system, resulting in spurious, transient or unsynchronized signals being written therein. If a pulse is written by a transient, it may fall between assigned spots on a track, and cannot be removed by writing over the same spot. Also, before a recording medium is initially placed in service, it must be reasonably free from magnetization for satisfactory operation. Generally, before a continuous loop type record member is placed in service, some variation in its external field from point to point can be anticipated due to the random orientation of the elementary regions of the magnetic surface of the record member. When the record member is demagnetized to a substantially neutral state, these elementary regions are so orientated as to produce a minimum external field. The term random orientation, as herein employed, does not refer to the completely random orientation which characterizes the magnetically neutral state of a record member.

The problem of erasing a record member of the continuous loop type is complicated by the normal speed rotation of such record member, since each elemental area of the magnetic recording medium remains under the influence of the erase device for only a relatively brief period of time per revolution when the record member is rotating.

Various methods have been employed in the prior art to effect erasing of a magnetic drum or other type of continuous loop record member, and may broadly be considered as comprising D.C. and A.C. erase systems. D.C. erase consists of heavily magnetizing the surface of the recording medium in a direction in which the reading head is sensitive. Using such system, it is possible to record data of only one polarity, since the drum is normally magnetized in one direction. One limitation in this system of erase is that since data of only one polarity can be sensed, it is impossible to determine whether or not data of the opposite polarity has been recorded. Another limitation associated with the D.C. system of erase is the high noise level existing after erase, as compared to the A.C. system. This high noise level results from magnetic or physical defects on the drum which appear as different levels of magnetization on the drum surface when the drum is saturated.

A.C. erase consists of demagnetization of the recording medium to a neutral magnetic state, one method consisting of subjecting it to a simultaneously alternating and decaying flux field, thereby subjecting the magnetic record member to increasingly smaller hysteresis loops. This technique requires that the initial magnetic erase field applied to the recording medium be sufficiently intense to magnetize each elemental area of the medium beyond its previous state.

Ideally, A.C. erasing should leave the surface of the recording medium in a "no bias" condition, and thus signals written in both directions will be equal. However, methods for obtaining this "no bias" condition in the prior art were unsatisfactory, since one or the other direction of magnetization tended to be favored and areas of the drum would be biased in one polarity or the other following completion of erase.

One method of A.C. erase employed in the prior art to effect erasure of a magnetic drum consists of inserting a choke having an air gap into a hole on the drum mounting, this air gap being so oriented that the flux path at the gap is completed through the drum surface when the choke is inserted into the drum mounting hole. In this method the drum is revolved at a normal rate of speed while the choke is first uniformly rotated through 90° to a position such that its flux path is transverse to the direction of drum rotation. The choke is then withdrawn from the hole at a uniform rate of speed. The 90° rotation of the choke tends to insure that all elemental areas of the recording medium under the influence of the choke are aligned in a direction substantially transverse to the direction in which the recording heads are sensitive, while the uniform withdrawal of the choke reduces this magnetic state to a minimum. Such a method of erasure is inherently tedious and time consuming, and requires that the choke be rotated at a uniform rate of speed, since the quality of erase is a function of the smoothness of rotation of the eraser. Further, this method of A.C. erase permits only a relatively small area of the recording medium to be erased in one operation, thereby limiting the number of information tracks which can be simultaneously erased.

Other methods commonly employed to accomplish an A.C. erasure are unsatisfactory for various reasons. In addition to the limited number of tracks which can be simultaneously erased with the resultant expenditure in time, other conventional methods require considerable auxiliary equipment. Certain A.C. systems require that the record member to be erased be either stopped or rotated at a slow rate of speed, thereby necessitating auxiliary driving apparatus. Thus the need for an erasing device capable of erasing the entire surface of a recording medium to a neutral magnetic state in a relatively brief interval of time is evident. Such a device should produce uniform results despite the level of the recording to be erased, should be capable of utilizing available alternating or direct current and should be relatively inexpensive to fabricate.

In accordance with the principles of the present invention, there is provided an improved A.C. erasing system adapted to demagnetize the surface of the recording medium to a substantially neutral state in a relatively brief period of time. The present apparatus employs an erase head extending the axial length of the drum and adapted to produce a uniform magnetic flux therefrom. A decaying current is applied to the erase head while the drum rotates at normal speed so that each elemental area in the recording medium is passed through generally decreasing hysteresis loops. The device operates from available line current, either alternating or direct, is relatively inexpensive to fabricate, the noise level remaining upon the recording medium after completion of the erase cycle is negligible and the entire erasing operation is completed in a very brief period of time.

Accordingly, one of the objects of the present invention is to provide an improved erasing device for magnetic recorders.

Another object of the present invention is to provide an improved device adapted to erase a record member by applying a simultaneously alternating and progressively diminishing magnetic field to the rotating surface of the recording medium to thereby substantially demagnetize the surface of the record member.

Another object of the present invention is to provide an improved apparatus adapted to accomplish an erasure of a continuous loop type of record member by employing a D.C. source in combination with a multiple gap erase head having associated multiple fields to thereby generate successive reversals of flux on each elemental area of the recording medium as it passes through the influence of the multiple fields.

A further object of the present invention is to provide an improved apparatus for erasing a rotating record member of the continuous loop type by employing an A.C. source in combination with an erase head having at least one gap for producing an associated field to thereby generate successive reversals of flux on each elemental area of the recording medium as it passes through the influence of the field.

Another object of the present invention is to provide an improved method for erasing the surface of a record member of the continuous loop type to a substantially neutral state by generating a decaying current, converting said current to a corresponding decaying flux pattern through a transducer extending the axial length of said record member and rotating the magnetic surface of said record member through the influence of said magnetic field so as to subject each elemental area of said record member to a plurality of reversals of magnetic state.

Other objects of the invention will be pointed out in the following description and claims and illustrated in the accompanying drawings, which disclose, by way of example, the principle of the invention and the best mode, which has been contemplated, of applying that principle.

Figures 3A, 3B:
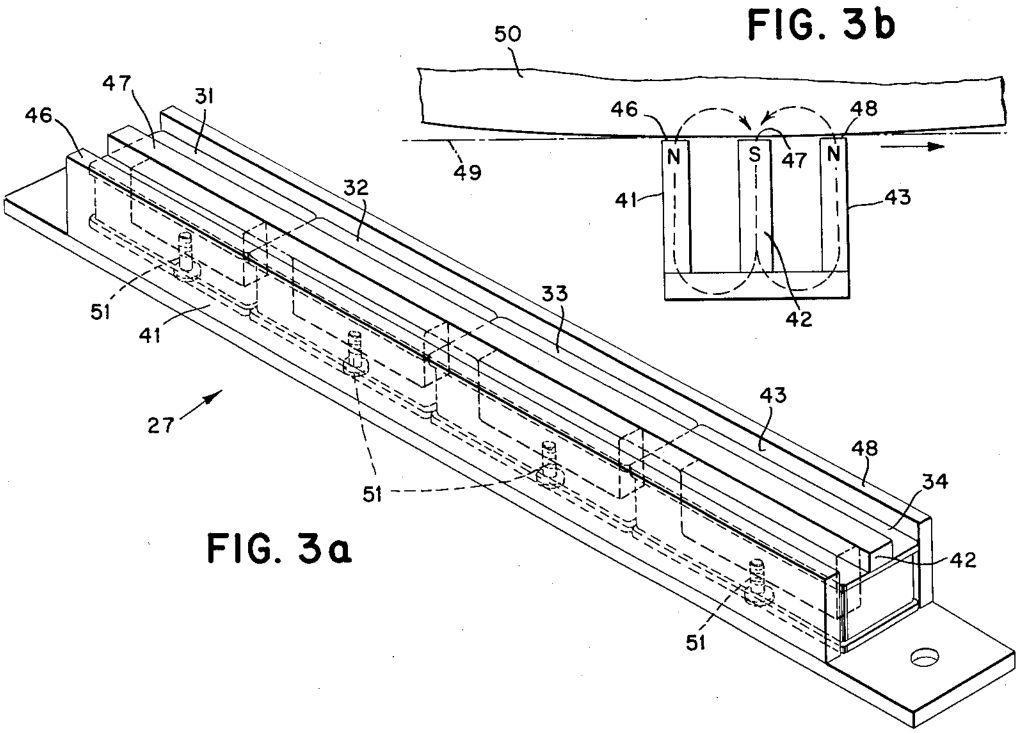

Fig. 3*a* is an isometric view of the erase head assembly.

Fig. 3*b* illustrates a cross sectional view of the erase head assembly and the record member and further illustrates the manner in which said record member and said erase head are magnetically linked.

Figure 4:
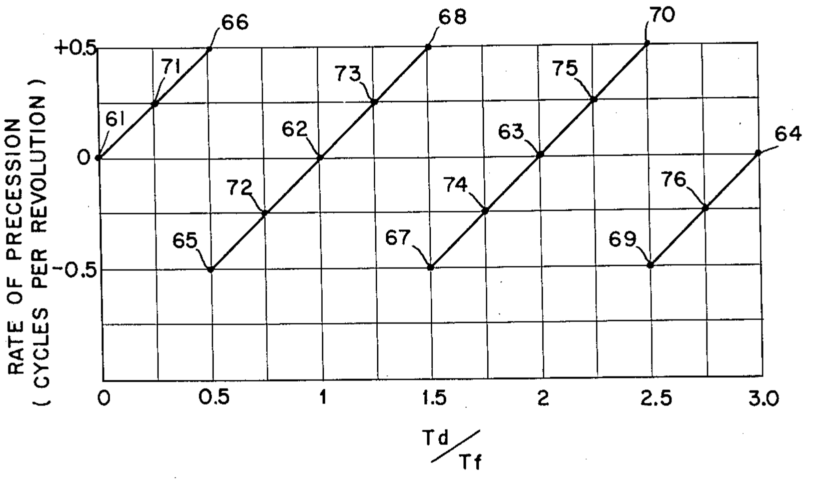

Fig. 4 is a family of curves illustrating the relationship between the rate of precession and the ratio of the drum period with respect to the erase flux period.

Figure 5:
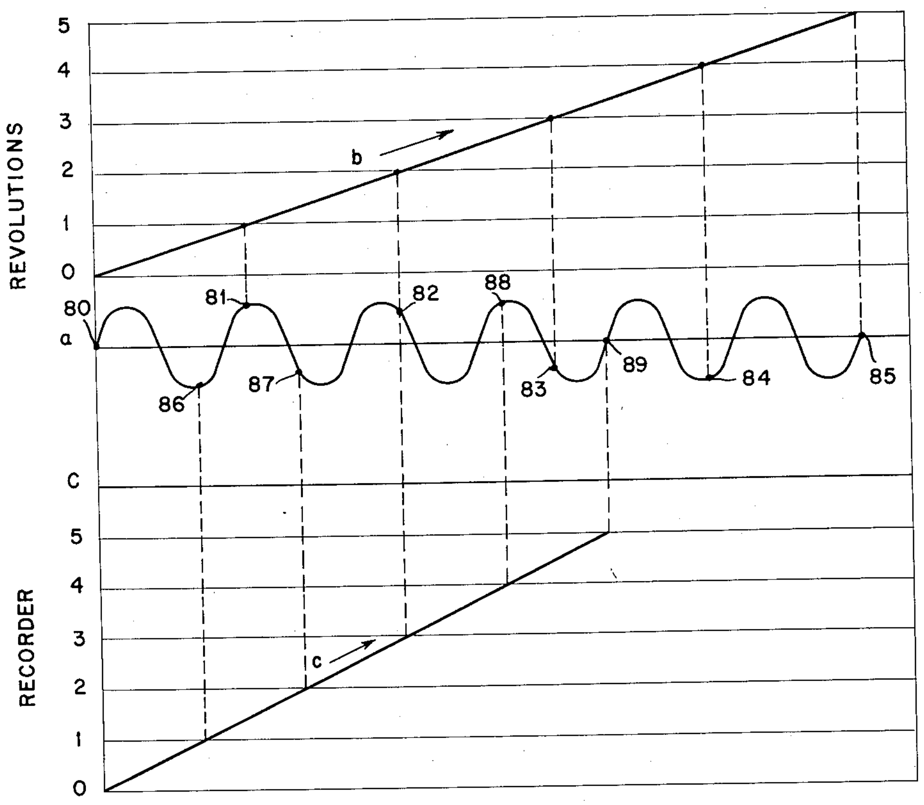

Fig. 5 is a timing diagram illustrating examples of positive and negative precessing of the record member with respect to the alternating erase current or flux.

Figure 6:
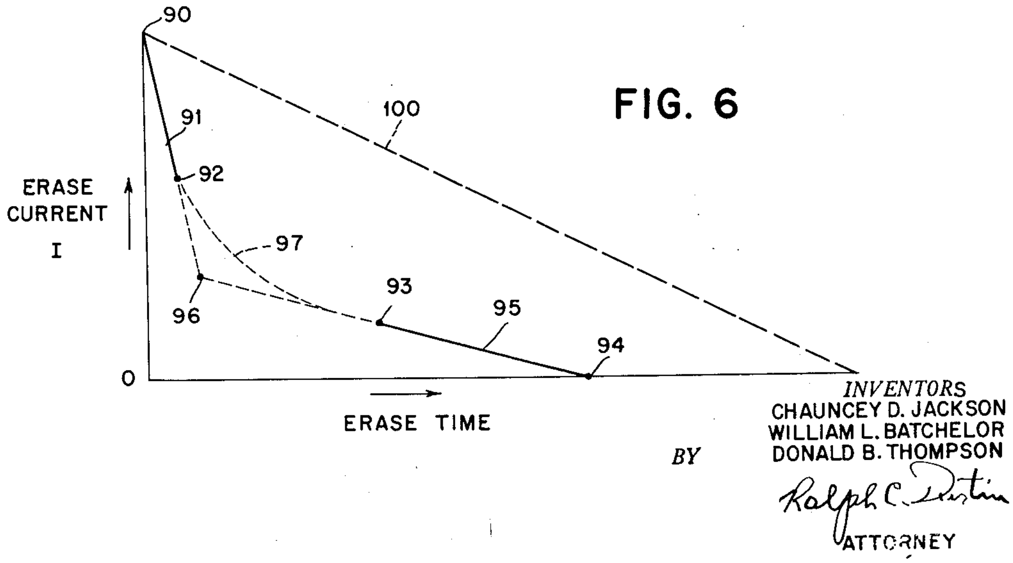

Fig. 6 illustrates preferred rates of decay of erase current as a function of time.

Figure 1:
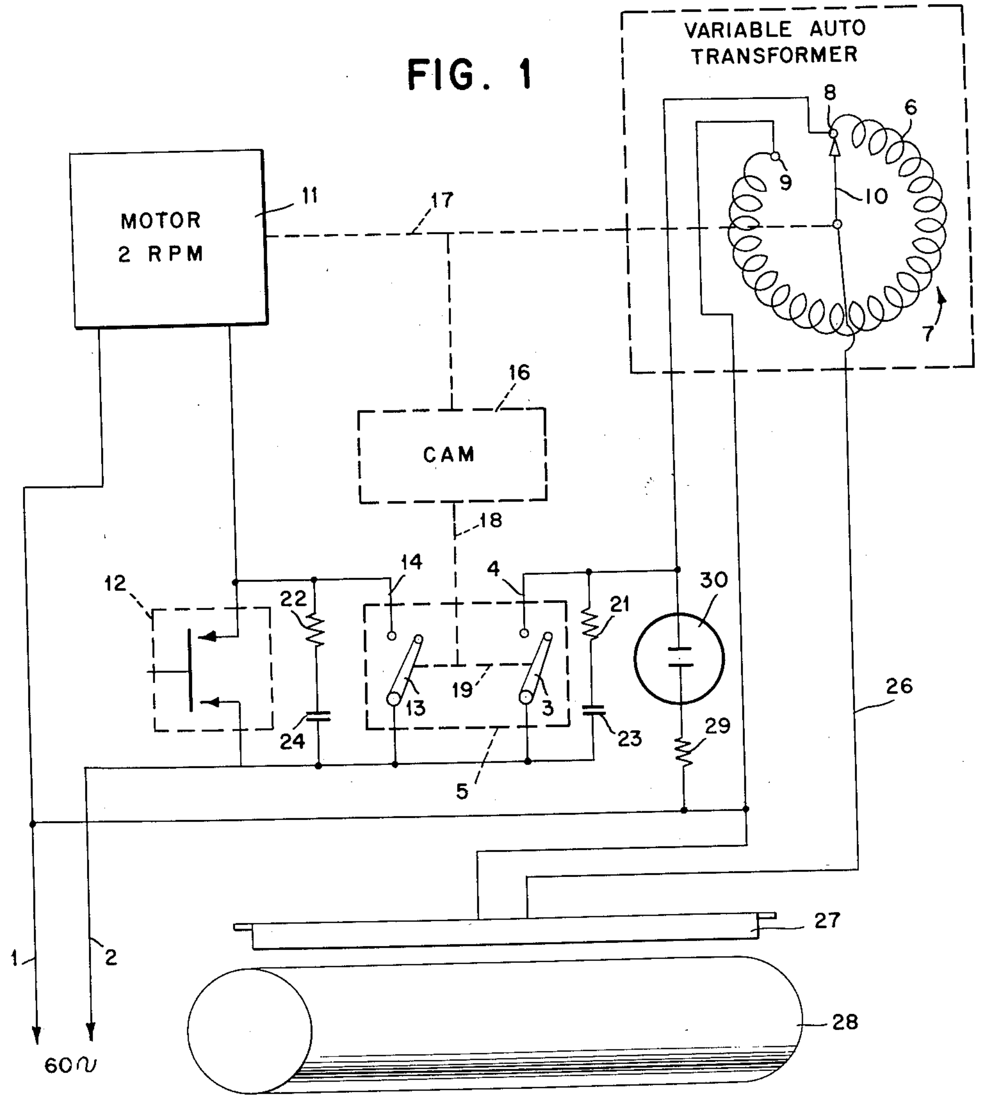
Fig. 1 illustrates in simplified schematic form a preferred embodiment of the present invention.

Referring now to the drawings and more particularly to Fig. 1 thereof, there is shown in block schematic form a preferred embodiment of the present invention. 60 cycle line current is applied through conductors 1 and 2 and contacts 3 and 4 of double pole single throw switch 5 to the primary winding 6 of autotransformer 7. Autotransformer 7 includes a 0° position 8, a 320° position 9 and rotating brush 10. The 60 cycle current is also applied to motor 11 through manually operated switch 12 and contacts 13 and 14 of switch 5. Motor 11 controls the rotation of autotransformer 7 and cam 16 through shaft 17. Cam 16 controls the operation of single pole double throw switch 5 through linkages 18 and 19. Resistors 21 and 22 together with capacitors 23 and 24 constitute arc suppression networks for protecting contacts 3 and 4, and 13 and 14 respectively of single pole double throw switch 5. The output from the secondary winding of autotransformer 7 is applied through brush 10 and conductor 26 as one input of erase head 27, the other input of which is connected to conductor 1. Erase head 27 converts the 60 cycle current from autotransformer 7 to a 60 cycle flux pattern, which is uniformly distributed across the entire surface of drum member 28. Maximum current output from autotransformer 7 is obtained at the zero position 8, while the current output at the 320° position 9 is substantially zero. For reasons to be described in greater detail hereinafter, autotransformer 7 is so constructed and so controlled as to produce a decaying 60 c.p.s. current which is applied to erase head 27. Neon indicator lamp 30 provides a visual indication of when the erasing operation is taking place, while resistor 29 limits the current applied to lamp 30.

In another preferred embodiment, the input conductors 1 and 26 to erase head 27 pass through a full wave rectifier, in order to provide a D.C. current to erase head 27. Since this embodiment is substantially identical to the embodiment illustrated in Fig. 1, a figure of this embodiment has been omitted from the drawings in the interest of simplicity.

Figure 2:
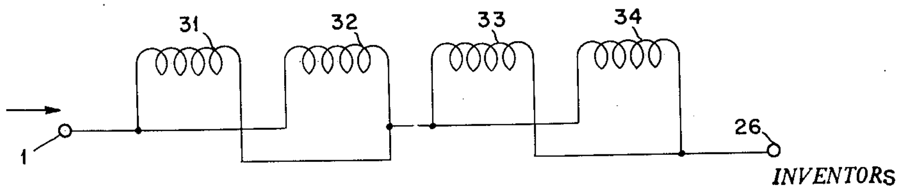
Fig. 2 illustrates a wiring diagram of the manner in which the erase coils are interconnected.

Referring now to Fig. 2 there is illustrated in schematic form the coil members employed in erase head 27 to obtain a uniform magnetic field across the surface of the erase head. Since it is difficult to fabricate a single coil having a length equal to that of the recording medium, the illustrated embodiment of the present invention employs four separate coils 31 through 34 interconnected in the manner illustrated. However, the number and size of coils which may be employed in the erase head to produce a given amount of flux uniformly across the recording medium is a matter of design and is determined, among other factors, by the axial length of the recording medium. Coils 31 through 34 are connected in a series-parallel arrangement in proper phase so that, when energized, a uniform magnetic field exists along the entire length of erase head 27.

Referring now to Fig. 3*a*, there is illustrated an isometric view of the erase head assembly. The erase head assembly includes an electromagnet having an E-shaped core member consisting of pole pieces 41, 42 and 43. The lower surface of pole piece 42 is effectively divided into four equal sections, each section having one of coils 31 through 34 mounted thereon. Coils 31 through 34 are wound on bobbins having an inner dimension adapted to fit the associated section of pole piece 42. The lower surface of pole piece 42 includes two threaded holes in each section by means of which it is secured to the core assembly by screws 51. When mounted in this manner, coils 31 through 34 are rigidly secured and the upper face 47 of pole piece 42 is in a plane with the upper faces 46 and 48 of pole pieces 41 and 43 respectively. When assembled in this manner, the erase head includes two air gaps, as will be shown and described in greater detail hereinafter. Coils 31–34 are so positioned that the field strength resulting from the fringe flux produced at the ends of each coil is substantially the same as that within the coils. When mounted on the drum assembly, the longitudinal axis of erase head 27 is parallel to the longitudinal axis of drum member 28, and a plane containing pole faces 46, 47 and 48 is parallel to a tangent 49 of the drum surface 50 and spaced .030" therefrom. The spacing between the erase head and the surface of the drum is not critical, and in general the density of the erase flux linking the surface of the drum is substantially inversely proportional to this spacing within normal operating ranges. The minimum spacing will be dictated primarily by requirements for protection of the drum surface. In the preferred embodiment herein described, satisfactory operation was obtained with minimum and maximum spacings of .015" and .070" respectively. Since the curvature of drum member 28 is negligible in the area under the erase head, pole faces 46, 47 and 48 are substantially parallel to the drum surface thus obviating the necessity for curvature of the pole faces to conform to the surface of drum member 28.

The erase head is slightly longer than the drum to thereby ensure a uniform flux pattern along the entire axial length of the drum. While a double gap head is employed in the preferred embodiment of the erase head for ease of fabrication and assembly, a single gap would provide satisfactory operation in the A.C. embodiment heretofore described. However, the D.C. embodiment requires a multiple gap erase head, as will be more fully described hereinafter.

Because the inductive reactance of the erase head is nominal at 60 cycles, the current through erase head 27 varies substantially as a function of the 60 cycles source. Furthermore, because substantially all of the reluctance of the magnetic circuit is in the air gap, the total reluctance of the circuit is essentially constant, and therefore the flux generated to erase head 27 is substantially proportional to the erase current.

The flux induced in the recording medium is primarly dependent upon the erase current, the numberof turns in the erase head coils and the spacing between the erase coils and the magnetic surface of the recording medium. For a given set of known conditions, i.e., the intensity of the flux to be erased, the spacing between the erase head and the recording medium, the magnetic characteristics both of the recording medium and of the gap between the erase head and the recording medium, the magnitude of the erase current and the number of turns on the erase coil is a matter of design. In the preferred embodiment herein described, the erase current applied to each of coils 31–34 of erase head 27 has a maximum R.M.S.

amplitude of 670 ma. and each of coils 31 through 34 has 500 turns wound thereon.

Because of the short duty cycle in which the eraser is employed, eddy current losses and the resultant heat produced thereby are not important and laminations in the core members are therefore not required. Since the major part of the magnetic reluctance is in the air gaps, permeability of the core is not critical, thereby obviating the necessity for special magnetic steels or soft iron. Thus a solid mild-steel stock core may be employed. simplifying the fabrication thereof and reducing the resultant cost.

Referring now to Fig. 3*b*, a plane containing pole faces 46, 47 and 48 is parallel to plane 49 tangent to the drum surface 50. The flux from the core of the erase head links the drum surface through two opposing paths. The first path is between pole faces 46 and 47, the second, between pole faces 48 and 47. Each elemental area of the recording medium is therefore subjected to a rapid reversal of flux as it passes through the successive gaps in a direction shown by the arrow. By subjecting each elemental area of the recording medium to such flux reversals, each of the elemental areas effectively receives a cycle of alternating flux each time the particular elemental area passes beneath the erase head. The repetition rate of the flux reversal applied to a given elemental area is determined by the peripheral speed of the drum while the intensity of the flux is a function of the instantaneous magnitude of the decaying 60 cycle erase current while the elemental area is beneath the erase head. If the interval of time required for an elemental area to pass through the influence of the erase head is small compared to the erase flux period, the erase flux during this interval may be considered to be constant. Furthermore, because of the fringing effect of the erase flux, the elemental area tends to come under the influence of the erase head gradually, and thus the waveform of the flux linking the elemental area during this interval approaches a sine wave.

To initiate operation of the subject apparatus, manually controlled switch 12 is closed, completing a starting circuit from the 60 c.p.s. supply line through conductors 1 and 2 to energize motor 11. Motor 11 is an induction motor which drives autotransformer 7 at a rate of approximately 2 r.p.m. The initial position of brush 10 of autotransformer 7 may be any desired position between the 320° position 9 and the zero position 8, as for example 340°. Switch 5 is maintained open by cam 16 between the 320° position 9 and the zero position 8 of autotransformer 7. Cam 16, mounted on the common shaft 17 of motor 11 and autotransformer 7, actuates double pole single throw switch 5 through linkages 18 and 19 to maintain contacts 3, 4 and 13, 14 closed between the 0° and 320° positions of autotransformer 7. Manually operated switch 12 must be held closed until switch 5 is actuated, at which time a holding circuit is completed from the 60 cycle supply lines 1 and 2 through contacts 13 and 14 to motor 11. Contacts 3 and 4 of switch 5 are closed only after brush 10 of autotransformer 7 reaches the 0° position 8, thereby preventing damage to winding 6 and brush 10 due to arcing Autotransformer 7, when energized by 60 c.p.s. current from conductors 1 and 2, supplies a decaying 60 c.p.s. output, varying between 130 and 0 volts, to erase head 27 of drum 28. During this 320° interval, brush 10 rotates along the entire winding 6, to cause a uniform decay of erase current. After the brush breaks contact with winding 6 at point 9, switch 5 is opened by cam 16, thereby de-energizing the erase circuit. Neon indicator lamp 30, a signaling device operative during the erase cycle, is extinguished when switch 5 is de-energized.

As heretofore described, the principle of A.C. erasing consists in passing the recording medium through a decaying alternating magnetic field in which the initial intensity of the field should be sufficient to reverse the existing remanent magnetic state of each elemental area of the recording medium. As a practical design consideration, however, since the level of the magnetically recorded signals on the recording medium is not generally known, the initial intensity of the magnetic field should be sufficient to completely saturate the recording medium.

The flux produced by the maximum erase current of 670 ma. R.M.S. applied to coils 31–34 of erase head 27 is not only sufficient to overcome the previous magnetic state of the recording medium but also allows for adequate operating margins, which are obviously a matter of design and will vary with the specifications of the individual apparatus. The above described preferred embodiment assures a relatively noise-and-bias free record medium upon completion of an erase cycle irrespective of the magnetic condition of the recording medium prior to erase. The apparatus further has an additional advantage in that the entire drum surface is erased simultaneously by a single erase head, thereby permitting the entire recording medium to be erased in a single operation.

In the preferred embodiment using D.C. erase current, the erase head must be a multiple gap transducer in order to provide the reverse flux paths through which each elemental area of the recording medium is passed. As an elemental area of the recording medium passes these fields, it is subjected to a rapid reversal of magnetic state. Since the amplitude of the D.C. source is relatively constant over a brief interval of time, or the time required for one revolution of the record member, the field strength remains constant and each elemental area of the recording medium is subjected to the same field intensity in a single revolution. In the preferred embodiment using D.C. erase current, the initial amplitude of the erase current would be determined by the particular application.

An important factor affecting the time required for an effective erase is the relationship between the period of drum rotation and the period of the erase current or flux. In the ensuing description, this relationship is represented by the ratio $Td/Tf$, where $Td$ is the period of rotation of the drum and $Tf$ the period of the erase flux. If these periods are identical, an elemental area on the periphery of the record member would be subjected to the same degree and direction of flux on each revolution, and no erasure would be accomplished. If the drum makes one revolution in a time less than or greater than the time of one flux cycle, the elemental area will be subjected to a different degree of magnetization on successive revolutions, and after a number of such revolutions, the flux direction will change, and erasure takes place. While the above description assumes an interval of time during which the magnitude of the erase current and flux are constant, it also applies where the erase current is progressively diminished over an erase cycle and the erasure is similarly affected as above described.

Since the period of rotation of the drum must be different from the period of the erase flux to accomplish a satisfactory erase, processing is employed. The term processing is defined as that phenomenon wherein a given elemental area on the periphery of the record member in one revolution is displaced with respect to the magnetic field in a succeeding revolution by an amount determined by the relationship between the two periods. Under this concept, positive or negative precessing may be provided. In the ensuing description, the term positive precessing defines the situation wherein the drum makes one revolution in a time greater than the time of one flux cycle, while the term negative precessing defines the situation where the drum makes one revolution in a time less than the time of one flux cycle.

The rate of precession may be expressed by the formula $$X=\frac{Td}{Tf}-Y$$

where X is the rate of precession in cycles per second and Y is the nearest integer to the ratio $$\frac{Td}{Tf}$$

In the particular case where the ratio $Td/Tf$ is less than 0.5, Y in the above formula is zero. From this expression it is apparent that the rate of precession lies within a range having upper and lower limits of +0.5 and −0.5 respectively. The period of rotation of the recording medium $Td$ is equal to the reciprocal of the rotational speed of the record member as expressed in revolutions per second, while the period of the erase flux is equal to the reciprocal of the erase frequency expressed in cycles per second.

Referring now to Fig. 4, there is shown a family of curves illustrating the relationship between the ratio $Td/Tf$ and the rate of precession. At the zero value of $Td/Tf$, indicated at point 61, the rate of precession is zero. This zero value occurs only when the record member is not rotating.

For every whole number value of $$\frac{Td}{Tf}$$

shown as points 62, 63 and 64, indicating synchronism between record member rotation and erase flux, the rate of precession is equal to zero. Therefore, considering an erase head having a single gap, each time an elemental area of the drum member comes under the influence of the erase head, it is subjected to the same direction of flux on successive revolutions of the drum member and no reversal of erase flux occurs in any elemental area of the recording medium, preventing erasure from taking place. Considering an erase head having multiple closely spaced gaps, each incremental area of the erase head is subjected to a reversal of flux, the intensity of the flux at any instant being determined by the amplitude of the sinusoidal erase current at that instant. Those areas on the drum coming under the influence of the erase head at the 0° and 180° points of the sinusoidal erase current will have zero flux applied thereto, since the magnitude of the current is zero. Thus no erase of those points on the drum surface occurring at and near zero flux is possible.

For values of $$\frac{Td}{Tf}$$

which are odd multiples of 0.5, points 65 through 70, the rate of precession equals ±0.5 cycle per revolution. Therefore, the erase flux linking any area of the record member reverses in successive revolutions. However, the erase at these values of $Td/Tf$ is imperfect because, as shown heretofore, certain areas of the record member are under the erase head only when the erase flux is at or near zero. Further, as $Td/Tf$ approaches a multiple of 0.5, the rate of precession approaches zero, while the time of a precessing period and the resultant erase time approach infinity. It is apparent from the above that a ratio of $Td/Tf$ at or near an odd multiple of 0.5 does not define a practical range of operation.

For values of $$\frac{Td}{Tf}$$

which are odd multiples of 0.25, points 71 through 76, the rate of precession is 0.25 cycle/revolution. In this case certain areas of the drum surface are under the erase head only when the erase flux=.707 its maximum value. This does not prevent satisfactory erase, but is a design criterion which influences the selection of maximum erase current.

As $Td/Tf$ approaches an integer, the effect is similar to that obtained as $Td/Tf$ approaches an odd multiple of 0.5. The erase time becomes prohibitively long, approaching infinity as a maximum. Thus a practical operating range is not indicated by a ratio of $Td/Tf$ at or near an integer or an odd multiple of 0.5.

From the curves shown in Fig. 4 in view of the above description, it is apparent the rate of precessing varies directly as the ratio of $Td/Tf$. While the values of $Td/Tf$ shown in Fig. 4 are limited for ease of illustration, the same relationship exists with respect to higher values thereof. The specific ratios of $Td/Tf$ at which satisfactory erasing cannot be accomplished in a reasonable time are limited, and may be readily determined as heretofore described. Thus satisfactory operation may be obtained over a wide range of the above parameters, subject only to the limitations heretofore described. It is further apparent that the above description is limited to the preferred embodiment utilizing A.C. erase current.

Referring now to Fig. 5, there is shown a timing diagram of erase current vs. record member rotation to illustrate the difference between positive and negative precessing. Curve *a* illustrates a series of 60 cycle sine waves representative of the erase current or flux, each complete cycle having a period of 1/60 second, this period being used as the reference point to illustrate positive and negative precessing. Curves *b* and *c* illustrate rotational periods of 3,000 and 4,500 r.p.m., or 1/50 and 1/75 seconds respectively, vs. record member revolutions.

Curve *b* illustrates an example of the heretofore defined positive precessing, wherein the ratio of $Td/Tf$ is 1.2 and the precessing rate +0.2 cycle per second. Thus, 1.2 cycles of erase current correspond in time to one revolution of the record member. Starting at point 80, points 81 through 85 on curve *a* correspond to the successive revolutions of the record member. The erase field precesses around the record member in a direction opposite to the direction of rotation of the record member at a rate of 72° per record member revolution, thus completing one cycle of precession in five record member revolutions.

Curve *c* illustrates an example of the heretofore defined negative precessing wherein the ratio of $Td/Tf$ is 0.8 and the precessing rate −0.2 cycle per second. Points 86, 87, 82, 88 and 89 on curve *a*, when extended to curve *c*, correspond to the successive revolutions of the record member at this rate. Thus 0.8 cycle of erase current correspond in time to one revolution of the record member. The erase field precesses around the record member in the direction of rotation of the record member at a rate of 72° per record member revolution, thus completing one cycle of precession in 5 record member revolutions.

From the above description, it is apparent that at certain other drum speeds, a greater or lesser number of rotations would be required for the field to complete a positive or negative precession cycle. While in the above examples the precession of the erase field completely closes upon itself after a certain number of revolutions of the record member, this is not required for satisfactory erase, and is obviously not attainable at certain speeds. The values of erase current and record member periods selected for the present example are merely illustrative of the principle involved.

Since the effects of precessing as affecting erase time have been described, the influence of the rate of decay of the erase current or flux on the noise level remaining on the record medium after completion of an erase cycle, together with design considerations influencing the selection of the rate of decay for a particular application, will now be described with reference to Fig. 6.

As previously described, demagnetization of a magnetic medium is accomplished by subjecting the medium to successively decreasing hysteresis loops, thereby continually reversing and reducing the remanent state of the magnetic medium. The smaller the incremental changes in remanent state are maintained, the closer the final remanent state tends to approach zero. This is obvious, since the final remanent state of the medium cannot exceed the incremental changes in remanent magnetism. The noise level remaining after completion of an erase cycle is the final remanent state of the magnetic medium.

In magnetic recording circuits, however, certain design considerations limit the rate of decay of erase current and the tolerable variations in remanent state of the recording medium resulting therefrom. One such limiting factor is the noise level or amount of remanent magnetism which can be tolerated, which is purely a design consideration in the overall recording system. Consistent with the amount of remanent magnetism which can be tolerated, the changes in absolute remanent states should not be so small that the erase time becomes prohibitively long. This consideration limits the minimum incremental changes in remanent state to practical limits. The maximum rate of change of erase current is in turn limited by the requirement that each elemental area in the recording medium must be subjected to a complete reversal of remanent magnetic state. If the decay of erase current is too rapid, it may drop to such a low level that it is unable to reverse the remanent state of an elemental area in successive revolutions. A rate of decay consistent with these limitations may be employed. In the interest of reducing the erasing time to a minimum and still obtaining a satisfactory erase, the erase current applied to the erase head may initially decay quite rapidly, and the final remanent condition of the record member may be controlled by the final rate of decay of the erase current.

Referring now to Fig. 6, there are curves illustrating a preferred variation of the rate of decay of erase current as a function of time. The initial value of erase current at time zero, shown at point 90, is sufficient to reverse any remanent magnetism on the record medium. This erase current then decreases rapidly to point 92 along slope 91, the minimum time to traverse this slope being the time required to completely reverse the magnetic state of each elemental area of the recording medium. Thus during the initial part of the erase cycle, the incremental changes in erase current and the corresponding change in flux may be relatively large. The final rate of decay in the erase cycle, from points 93 to 94 along slope 95, is relatively small so that the incremental changes in flux, which determine the final remanent state or noise level remaining after erase as described above, are similarly quite small. Slopes 91 and 95 are matters of design, determined for a particular application as heretofore described. The final consideration to complete the erase cycle consists of interconnecting points 92 and 93 in the erase curve, the manner of such interconnecting being primarily dictated by equipment considerations. Two possible means of such interconnection are illustrated. The straight line method, obtained by extending slopes 91 and 95 until they intersect at point 96, provides a rapid change from the initial to the final slope, and could be accomplished, for example, by a switching action. Curve 97, interconnecting points 92 and 93, could be obtained for example, by the use of a non-linear impedance element. The complete decay curve from point 90 to point 94, along segments 91, 97 and 95, could be generated by substituting a non-linear autotransformer having decay characteristics corresponding to the complete decay curve, for the linear autotransformer 7 in the preferred embodiment in Fig. 1. The decay characteristic in the preferred embodiment of Fig. 1 is linear, as indicated by curve 100, while the time for a complete cycle, as heretofore noted, is 27 seconds. The above described curve merely illustrates general considerations in selecting erase current decay characteristics. From the general considerations, characteristics for a specific application may be readily determined.

One effect of the present erasing device, not heretofore noted, is the tendency of the device to act as a magnetic brake during operation. Such braking effect might be sufficient to change the speed of a drum and thereby effect a change in T*d* and change the ratio *Td*/*Tf* without a positive drive system. However, by employing a positive drive system such as a constant speed motor with direct, geared or timing belt drive, this effect is overcome during the erasing cycle.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A system adapted to erase a magnetic record member of the continuous loop type while maintaining the normal rotational speed of said record member comprising a source of current, means for progressively diminishing said current, an erasing device coupled to said current source and positioned adjacent to said record member, said erasing device including means responsive to said current for producing progressively diminishing alternating flux patterns and means for providing multiple rotation of said record member through the influence of said progressively diminishing alternating flux patterns whereby each elemental area of said record member is subjected to successive magnetic field reversals of generally decreasing intensity until each of said elemental areas is magnetically neutralized.

2. A system adapted to erase a record member of the continuous loop type by progressively diminishing the erase flux applied thereto while maintaining the normal speed of rotation of said record member comprising an erasing device having a winding thereon and positioned adjacent to said record member, said record member having a magnetic surface thereon, means for maintaining the record member at its normal speed of rotation to provide relative rotative movement between said magnetic surface of said record member and said erasing device, a source of current, means coupling said source of current to said winding for energizing said erasing device and means for providing the period of rotation of said record member to be harmonically asychronous with respect to the period of said current source as the intensity of said erase flux is progressively diminished.

3. An erasing system adapted to erase a magnetic record member of the continuous loop type comprising an erasing device extending the axial length of the record member and adapted to provide a substantially uniform flux therefrom, a source of progressively diminishing current, means to energize said erasing device with said current to provide progressively diminishing flux patterns and means for providing the period of rotation of said record member to be harmonically asynchronous with respect to the period of said current applied to said erasing device whereby each elemental area of said record member is subjected to the influence of flux patterns of generally decreasing intensity on successive revolutions of said record member.

4. An apparatus of the type claimed in claim 3 wherein said erasing device includes a single electromagnetic member having at least two pole pieces of opposite polarity.

5. An erasing system adapted to neutralize the magnetic surface of a continuous loop type of magnetic record member comprising an erasing device extending the axial length of said record member and positioned adjacent thereto, a source of current, means for progressively diminishing the amplitude of said current, means for exciting said erasing device with said progressively diminishing current to thereby produce a progressively diminishing flux field extending the axial length of said magnetic record member and means for providing the period of rotation of said record member to be harmonically asynchronous with respect to the period of the current applied to said erasing device whereby the magnetic surface of said record member is neutralized by subjection to said progressively diminishing flux field.

6. A device for erasing magnetically recorded signals from a magnetic record member of the continuous loop type comprising an erasing device having a winding thereon and positioned adjacent to said record member, a source of alternating current, means coupling said current source to said winding, means for progressively diminishing the amplitude of said current and means for providing precessing rates of movement between the period of rotation of said record member and the period of said current whereby each elemental area of said record member is subjected to successive reversals of magnetic state during each revolution of said record member as the intensity of the magnetic field generated by said erasing device is progressively diminished.

7. An apparatus of the type claimed in claim 6 wherein said erasing device comprises an electromagnet extending the axail length of said record member, said electromagnet being adapted to generate a substantially uniform flux throughout said axial length.

8. An erasing system adapted to erase magnetically recorded signals from a revolving record member of the continuous loop type by subjecting said record member to successively decreasing flux fields comprising a magnetic member extending the axial length of said record member and having its longitudinal axis parallel to the longitudinal axis of said record member, said magnetic member having at least one pole piece on one surface thereof, a source of current progressively diminishing from a maximum to a minimum value, means for energizing said magnetic member with said source of current to thereby provide a progressively diminishing magnetic field across said pole piece, and means for providing the period of rotation of said record member to be harmonically asynchronous with respect to the period of the current applied to said record member whereby each elemental area of said record member is subjected to flux reversals of progressively diminishing intensity each revolution of said magnetic member.

9. A device for erasing magnetically recorded signals from a revolving record member of the continuous loop type by demagnetizing the magnetic surface thereof to a substantially neutral state comprising, an erase head positioned adjacent to and extending the length of said record member, said erase head having a plurality of pole pieces on one surface thereof, a source of direct current, means for progressively diminishing the amplitude of said direct current, means to energize said erase head with said direct current to thereby provide magnetic fields of opposite polarity between adjacent pole pieces, and means to rotate said record member through said magnetic fields a plurality of revolutions whereby each elemental area of said record member is subjected to reversals of magnetic state of progressively diminishing intensity as it passes through the influence of each of said magnetic fields.

10. An apparatus for erasing a magnetizable record member of the continuous loop type comprising an erasing device positioned adjacent to said record member and adapted to apply a magnetic field to said record member in response to a current supplied thereto, a source of current, means for progressively diminishing said source of current to produce a corresponding variation in said magnetic field and means for providing the period of rotation of said record member to be harmonically asynchronous with respect to the period of said current supplied to said erasing device.

11. Apparatus for causing a magnetizable record member to be magnetically neutralized comprising means to generate a magnetic field whose field intensity decays from a maximum to a minimum value during a given interval, a magnetizable record member and means to provide relative motion between said magnetizable member and said magnetic field by rotating said record member at normal speed, the period of rotation of said record member being harmonically asynchronous with respect to the period of said magnetic field whereby each elemental area of said magnetizable member passes cyclically through said progressively decreasing magnetic field during said given interval.

12. A device of the character described in claim 11 wherein said field intensity maximum is sufficient to cause magnetic saturation of said magnetizable record member.

13. In a system for erasing a magnetizable and rotatable record member, the combination comprising an erasing device positioned adjacent to the surface of said record member, a source of current associated with said erasing device, means for progressively reducing the current applied to said erasing device whereby the magnetic field produced by said erasing device is caused to decay from a maximum to a minimum intensity and means for rotating said record member a plurality of revolutions through said decaying magnetic field, the speed of rotation of said record member being harmonically asynchronous with respect to the period of said magnetic field whereby the entire magnetic surface of said record member is restored to a substantially non-magnetic state.

14. In a system for erasing a magnetic record member of the continuous loop type, an erasing device positioned adjacent to said record member and operative to generate a magnetic field when energized, said erasing device including an erase head so constructed as to develop magnetic fields of uniform intensity in opposite directions in distinct portions thereof, means for progressively decreasing the current applied to said erasing device from a maximum to a minimum value to provide a corresponding variation in the strength of the magnetic field produced by said erasing device during a predetermined time interval, and means for causing said record member to be repeatedly and cyclically moved past the influence of said erasing device so as to be subjected to reversing magnetic fields of progressively decreasing intensity during said predetermined time interval.

15. In a system for demagnetizing a record member of the continuous loop type, an erasing device positioned adjacent to said record member, said erasing device comprising a plurality of pole pieces and having at least one energizing coil, said coil being so wound that the magnetic field developed in adjacent pole pieces is oppositely directed with respect to said record member when said coil is energized, means for progressively decreasing the strength of the magnetic field provided by said pole pieces from a maximum to a minimum intensity in a predetermined interval of time, and means to provide relative motion between said record member and said erasing device by rotating said record member a plurality of revolutions during said predetermined interval whereby each elemental area of said record member is subjected to successive reversals of magnetic state during said predetermined interval of time.

16. Apparatus for demagnetizing a record member having a magnetic surface thereon comprising an erasing device having one surface positioned adjacent to said record member, said erasing device comprising an electromagnetic member having a plurality of pole pieces on said surface adjacent to said record member, said electromagnetic member being so constructed as to provide magnetic fields of opposite polarity across adjacent ones of said plurality of pole pieces when energized, means for decreasing the strength of said magnetic fields from a maximum to a minimum intensity over a predetermined interval, and means for repetitively rotating said record member through the influence of said plurality of pole pieces as said intensity is progressively decreased whereby each elemental area of said magnetic surface is subjected to successive reversals of magnetic state of generally decreasing intensity until each of said elemental areas is demagnetized to a substantially neutral magnetic state.

17. Apparatus for demagnetizing the magnetic surface of a continuous loop record member to a substantially neutral state comprising an electromagnetic member mounted in fixed relation to and extending the axial length of said record member, said electromagnetic member including a plurality of pole pieces and being so constructed as to provide, when energized, magnetic fields of opposite polarity across adjacent ones of said plurality of pole pieces, means for so energizing said electromagnetic member as to produce a uniformly decaying magnetic field along said electromagnetic member, said means including a motor driven rheostat interconnected between a current source and said electromagnetic member, and means for successively passing said magnetic surface through the influence of said pole pieces whereby each elemental area of said magnetic surface is caused to traverse successively decreasing hysteresis loops until a magnetically neutral state is obtained.

References Cited in the file of this patent

UNITED STATES PATENTS

| | | |
|---|---|---|
| 2,118,174 | Doane | May 24, 1938 |
| 2,355,940 | Zuschlag | Aug. 5, 1944 |
| 2,481,392 | Camras | Sept. 6, 1949 |
| 2,535,480 | Begun | Dec. 26, 1950 |
| 2,535,481 | Begun | Dec. 26, 1950 |
| 2,702,835 | Camras | Feb. 22, 1955 |
| 2,733,300 | Menard | Jan. 31, 1956 |
| 2,766,328 | Handschin et al. | Oct. 9, 1956 |
| 2,816,176 | Taris et al. | Dec. 10, 1957 |
| 2,826,643 | Greiner | Mar. 11, 1958 |

FOREIGN PATENTS

| | | |
|---|---|---|
| 667,011 | Great Britain | Feb. 20, 1952 |